(12) United States Patent
Schabacker et al.

(10) Patent No.: US 10,569,699 B2
(45) Date of Patent: Feb. 25, 2020

(54) LINEAR ILLUMINATION DEVICE

(71) Applicant: SCHOTT AG, Mainz (DE)

(72) Inventors: Stephan Schabacker, Wiesbaden (DE);
Hubertus Russert, Jugenheim (DE);
Eric Senner, Hackenheim (DE);
Markus Kappel, Roxheim (DE)

(73) Assignee: SCHOTT AG, Mainz (DE)

( * ) Notice: Subject to any disclaimer, the term of this patent is extended or adjusted under 35 U.S.C. 154(b) by 127 days.

(21) Appl. No.: 15/260,977

(22) Filed: Sep. 9, 2016

(65) Prior Publication Data

US 2017/0072841 A1    Mar. 16, 2017

(30) Foreign Application Priority Data

Sep. 10, 2015 (DE) .................. 10 2015 115 265

(51) Int. Cl.
| | | |
|---|---|---|
| *B60Q 1/32* | (2006.01) | |
| *F21V 8/00* | (2006.01) | |
| *F21S 43/245* | (2018.01) | |
| *F21K 9/61* | (2016.01) | |
| *B60Q 3/217* | (2017.01) | |
| *B60Q 3/64* | (2017.01) | |
| *B60Q 3/78* | (2017.01) | |
| *B60Q 1/26* | (2006.01) | |
| *F21W 107/10* | (2018.01) | |

(52) U.S. Cl.
CPC ........... *B60Q 1/323* (2013.01); *B60Q 1/2696* (2013.01); *B60Q 3/217* (2017.02); *B60Q 3/64* (2017.02); *B60Q 3/78* (2017.02); *F21K 9/61* (2016.08); *F21S 43/245* (2018.01); *G02B 6/001* (2013.01); *G02B 6/0006* (2013.01); *F21W 2107/10* (2018.01)

(58) Field of Classification Search
CPC .. G02B 6/0013; G02B 6/0066; G02B 6/0081; F21S 43/237; F21S 43/245; B60Q 1/323; B60Q 1/2696
USPC ........................................................ 362/554
See application file for complete search history.

(56) References Cited

U.S. PATENT DOCUMENTS

| | | | | |
|---|---|---|---|---|
| 6,407,785 | B1 * | 6/2002 | Yamazaki | G02B 6/0008 349/113 |
| 6,523,986 | B1 | 2/2003 | Hoffmann | |
| 7,347,606 | B1 * | 3/2008 | Patten | F21V 15/013 362/152 |
| 2011/0103757 | A1 | 5/2011 | Alkemper et al. | |
| 2013/0314940 | A1 | 11/2013 | Russert | |
| 2014/0098562 | A1 * | 4/2014 | Gomez | F21S 41/322 362/600 |

FOREIGN PATENT DOCUMENTS

| | | |
|---|---|---|
| DE | 102006011108 | 9/2007 |
| DE | 102007015841 | 6/2008 |
| DE | 202008011063 | 2/2010 |
| DE | 102009039556 | 3/2010 |
| DE | 102012208810 | 11/2013 |

(Continued)

*Primary Examiner* — Karabi Guharay
(74) *Attorney, Agent, or Firm* — Ohlandt, Greeley, Ruggiero & Perle, L.L.P.

(57) ABSTRACT

A linear illumination device is provided in which a transparent light guide made of glass is recessed in a profile opposite to a dark surface. A linear illumination device is also provided having a glass fiber bundle in a dyed tube.

13 Claims, 5 Drawing Sheets

(56) References Cited

FOREIGN PATENT DOCUMENTS

| DE | 102013015907 | 3/2015 |
| EP | 1122487 | 8/2001 |
| WO | 2007047304 | 4/2007 |
| WO | 2009100834 | 8/2009 |

* cited by examiner

LINEAR ILLUMINATION DEVICE

CROSS REFERENCE TO RELATED APPLICATIONS

This application claims benefit under 35 U.S.C. § 119(a) of German Patent Application No. 10 2015 115 265.7 filed Sep. 10, 2015, the entire contents of which are incorporated herein by reference.

BACKGROUND

1. Field of the Invention

The invention relates to a side-emitting linear illumination device. More particularly, the invention relates to a linear illumination device which finds application as contour lighting for vehicles, especially as exterior lighting. Specifically, the invention relates to a footboard including a linear illumination device. The linear illumination device according to the invention may however also be used for other applications, in particular in the building and furniture sector.

2. Description of Related Art

Contour lighting is increasingly being employed, in particular due to the wide-spread use of LED technology. This is also true in the vehicle sector, inter alia.

Document DE 20 2008 011 063 U1 (Schott AG) discloses an illumination device for vehicles, which is in particular intended for use as a footboard lighting.

A drawback of known contour lighting for vehicles mostly relates to the cumbersome installation thereof. For example, the mat described in the above document needs to be installed in a casing which moreover generally has to be waterproof and dustproof.

Also, it is difficult with such systems to provide a sharply contoured limited linear light which is barely visible in daylight.

SUMMARY

The invention is therefore based on the object to provide a linear illumination device which is robust and can be easily installed.

Moreover, a sharply contoured lighting is to be ensured, and in daylight the linear illumination device according to the invention should be visible the least possible.

The object of the invention is already achieved by a linear illumination device described herein.

The invention relates to a linear illumination device, that means a lamp which emits light along a line. This line is preferably straight, but may be curved as well.

The linear illumination device comprises a side-emitting transparent light guide made of glass.

Preferably, the side-emitting light guide is provided in the form of a transparent glass rod, so it is a rigid component. The glass rod preferably has a diameter from 0.2 to 10 mm, more preferably from 0.5 to 5 mm, and most preferably from 2 to 4 mm.

For such a light guide, in particular a light guide as described in published patent application DE 10 2012 208 810 A2 can be used. Such a light guide consists of a glass rod which includes a core of colored glass, in particular a core of white colored glass. The glass rod comprises a cladding material that has a lower refractive index than the glass rod itself so that total internal reflection occurs at the walls of the glass rod thereby allowing for the propagation of light. The core of colored glass within the glass rod acts as a scattering center thereby causing emission of light sidewards. The glass rod has a diameter which preferably is five to twenty times that of the core of colored glass. In this manner, a sharply limited and contoured line is produced.

The core of colored glass may but need not be positioned exactly in the center of the glass rod, rather it may as well be positioned non-axially. This provides for directional emission of a larger part of the light to the lateral side, because the glass rod acts as a lens. Such a glass rod may be produced, for example, by bundling a colored glass rod together with a plurality of rods of transparent material and drawing out a glass rod from this bundle in a drawing process. The positioning of the color glass rod among the other rods determines the position of the colored glass core.

It will be understood that instead of a colored glass core it is likewise possible to use a glass that includes rather large particles which act as scattering centers.

The side-emitting transparent glass light guide is held in a profile with positive interlocking fit by means of a mounting member.

In particular it is contemplated to use a plastic mounting member which for example is made of rubber, which is slid or snapped into place in a profile, in particular in a metal profile.

Preferably, the mounting member is inserted into the profile together with the side-emitting transparent light guide.

The mounting member is preferably made of a flexible plastic such as rubber or silicone, in particular with a Shore A hardness of less than 90, preferably less than 80.

Preferably, the mounting member surrounds the light guide by at least 270°. The opening angle of the linear illumination device towards the viewer is less than 90°, preferably between 30° and 90°.

Therefore, the mounting member itself is preferably also provided in form of a profile, in particular a plastic profile.

The mounting member and/or the profile have complementary interlocking, i.e. form-fitting elements by means of which the mounting member is secured.

At the same time, the mounting member holds the transparent glass light guide in place with form-fitting engagement.

Preferably, the mounting member is secured against rotation relative to the profile, in particular by the interlocking elements described above.

It has been found that such a system is surprisingly robust and weatherproof.

Furthermore, such a transparent glass rod is inconspicuous in daylight, since the viewer can look through the rod, except for the core of colored glass.

The light is injected into the glass rod at one end, preferably at both ends thereof, and the light source is preferably located in a cap that is attached to the profile.

In one embodiment of the invention, the mounting member and/or the profile is dark on a rear side of the light guide, i.e. the side facing away from the viewer.

In particular, the surface behind the glass light guide has an L* value of less than 40, preferably less than 30, more preferably less than 15 in the L*a*b* color space.

This surface is preferably black or dark gray.

In particular, the a* value differs from the b* value by not more than 10, preferably not more than 5. Preferably, the a* and b* values are less than 20, more preferably less than 10.

Combining a dark background with a transparent glass rod allows to create a linear illumination device that is almost invisible in daylight.

An outer surface of the glass rod is preferably arranged directly at the exterior side of the linear illumination device. That is to say, the light is not emitted by passing through a pane or other devices. This allows for a simple configuration of the illumination device. Nevertheless, the linear illumination device of the invention is weatherproof and robust. The transparent light guide made of glass is therefore preferably exposed as seen from a viewer's side.

In a preferred embodiment, the transparent light guide made of glass is set back relative to the adjacent profile, in particular by at least 0.5 mm, preferably by at least 1 mm.

The transparent light guide made of glass is therefore recessed in the profile so that damage to the glass rod is avoided. The glass rod preferably has a diameter of less than 10 mm, more preferably less than 5 mm. If the glass light guide is installed in a footboard, for example, the adjacent profile will prevent contact with the shoe of an entering vehicle occupant, for example.

Furthermore, in one embodiment of the invention the mounting member has wings laterally projecting beyond the light guide, which also protect the glass light guide from mechanical contact.

In one embodiment of the invention, the transparent light guide made of glass is connected to an LED light source that is arranged at an angle thereto via a flexible light guide.

In particular it is contemplated to use a glass fiber cable for the flexible light guide, which may for instance be terminated by a ferrule at both ends thereof. On one end the glass light guide is connected, and on the other end the LED light source. This allows for a compact configuration in which the light guide made of glass can be disposed close to the outer surface without having the LED light source projecting. In particular, the glass light guide is set back with respect to the adjacent profile by less than 10 mm.

For the LED light source a fluid-tight LED light source can be employed, for example.

Alternatively or in combination it is also conceivable to seal the light guide made of glass and/or the flexible light guide with respect to an adjacent casing by passing the light guide through a seal, for example. The casing may for example be provided in form of a cap for the profile. In the so created fluid-tight space even an LED light source which itself is not fluid-tight can be arranged.

As an alternative to a connection via a flexible light guide it is in particular contemplated that the light guide made of glass is terminated obliquely at an end thereof, and that the light is irradiated from an LED light source arranged laterally thereto. The light is injected into the light guide made of glass by total internal reflection at the oblique surface.

This embodiment allows for an even more compact configuration, however it has the drawback that a less homogeneous light intensity distribution might result
in the end region.

The invention further relates to a linear illumination device, in particular a linear illumination device as described above, that is to say which comprises a side-emitting transparent light guide made of glass.

The side-emitting transparent light guide made of glass comprises a colored glass core adapted for injecting light at an end thereof. The side-emitting transparent light guide is connected to a light source, in particular an LED light source, via a glass fiber cable which is flexible.

The dyed glass of the colored glass core advantageously consists of a glass which has scattering centers incorporated therein. The scattering centers of the colored glass are usually created by phase separation and/or demixing of the glass. For example, the colored glass might be an As—Pb-containing silicate glass with scattering centers embedded therein which have an increased content of Pb and which were produced by phase separation and/or segregation. Such a glass is commercially available as a colored glass from various manufacturers. The available glass rod which has a diameter of several millimeters is usually drawn to a typical thickness of between about 100 µm and 1 mm as previously described in order to create the colored glass core.

The glass fiber cable is preferably terminated by a ferrule, at least at the end facing the side-emitting light guide.

In particular, a preferably pot-shaped ferrule made of a transparent plastic material is used. The glass fiber cable is usually enclosed by a tube, i.e. it comprises a bundle of glass fibers each of which consists of a core glass that is enclosed by a material of a lower refractive index (cladding) so as to obtain total internal reflection.

For terminating the glass fiber bundle, the end thereof can be introduced into the ferrule, but preferably without the tube, and can be secured therein by filling an adhesive into the ferrule. In particular a transparent UV curing adhesive can be used.

In order to avoid light from being directly injected into the colored glass core at the end thereof, a base of the ferrule has a pin projecting inwardly opposite to the colored glass core, or the base is covered, in particular dyed.

Preferably, the bottom has a pin opposite to the colored glass core, which displaces the individual glass fibers of the glass fiber cable in the area of the colored glass core, so that less or no light is injected in the area of the colored glass core.

Alternatively, it is conceivable as well to simply cover or dye the area opposite to the colored glass core. However, a drawback of this embodiment variation is that most of the light conducted in this area of the glass fiber cable will be lost.

The invention further relates to a linear illumination device, in particular as described above, which comprises a side-emitting transparent light guide made of glass which comprises at least one colored glass core for emitting light. Light is injected into at least one end of the side-emitting light guide.

Preferably, the light is injected by a light source directly adjoining the end of the side-emitting light guide, in particular by an LED light source.

According to the invention, the end of the side-emitting light guide is masked in the area of the colored glass core.

Thus, as already stated above, the colored glass core is covered so that in the area of the colored glass core no light or less light is injected into the light guide, whereby inhomogeneities are reduced.

The masking may be disposed on the side of the light source, in particular on a housing of the light source.

For example, a housing may be provided with a transparent base which is opaque in the area of the colored glass core.

Also, the housing may comprise an opaque cover in the area of the colored glass core, which may be connected with a side wall of the housing by at least one web, for example.

In another embodiment of the invention, the side-emitting light guide itself is masked in the area of the colored glass core.

As an alternative to a ferrule having an opaque spot, this may be achieved by coating the end of the side-emitting light guide in the area of the colored glass core, for example.

The invention further relates to a linear illumination device which comprises a side-emitting glass fiber cable, which is arranged in a tube.

Such a side-emitting glass fiber cable is disclosed in WO 2009/100834 A2, for example. Compared to the first embodiment of the invention, a glass fiber cable has the advantage that it is flexible.

According to the invention, the tube is dyed so as to be dark, in particular it exhibits an average transmittance of less than 40%, preferably less than 30% in the visible range of light.

This embodiment therefore represents another way to allow for a configuration of the linear illumination device which is virtually invisible in unlit condition.

Instead of providing a dark background, the tube by which the glass fiber cable is jacketed is dyed so that it almost appears black in unlit condition and thus is virtually invisible.

More particularly, the material of the tube has an L* value of less than 40, preferably less than 30, and more preferably less than 15 in the L*a*b color space.

The a* and b* values are preferably less than 20, more preferably less than 10.

The black jacket may be made of a plastic, in particular of a polyethylene, polypropylene, or a silicone, or of PVC. The black color may be achieved, for example, by admixing soot particles.

In another embodiment of the invention in which in particular an adjacent seat or receptacle is not black, the tube is dyed in a color matching the color of an adjacent seat or receptacle or an adjacent covering part.

The tube may be embedded in a profile, for example, but also in a covering, such as a wall, door or ceiling covering of a vehicle or of a building, which is of a specific color.

The tube, again, preferably exhibits an average transmittance of less than 40%, preferably less than 30% in the visible range.

With a coloration that matches the color of an adjacent receptacle, a virtually invisible integration of the glass fiber cable becomes possible.

In particular, in the L*a*b* color space the a* and/or b* values of the adjacent receptacle or adjacent covering part and of the tube differ by less than 10, preferably less than 5.

As an alternative to colorful or black dyeing, according to one embodiment of the present invention it is contemplated to dye the tube in an achromatic color different from black, in particular silver. For this purpose, aluminum oxide particles may be used, for example.

In particular, pigment particles with a with a mean particle diameter between 5 nm and 10 μm, preferably between 0.1 μm and 10 μm, in particular preferred between 0.5 μm and 5 μm can be used.

According to an embodiment, an inorganic dyeing is used as pigment, which is added as a dyeing concentrate to the material of the tube.

The pigments can comprise and amount between 2 to 60% of pigments which are mixed with a carrier material.

As carrier material, e.g. a polyethylene, in particular LLDPE (linear low density polyethylene), a polypropylene or a thermoplastic polyurethane can be used.

The dyeing concentrate (so called masterbatch) is admixed at the extruder in an amount of 0.1-20%, preferably of 1 to 10% (weight %).

Spherical pigments as well as rounded to flat pigments can be used, in particular flaky pigments, which serve as small mirrors.

The appearance of the application depends, in a great extent, on the pigments. This applies especially to the homogeneity (emission effect).

By using plane pigments, a specific effect can be achieved when shining through the tube.

Depending on the view angle, the tube appears darker or brighter due to the orientation of the reflecting surfaces.

According to a further embodiment, a structuring in the tube jacket is achieved by the arrangement and distribution of the pigments.

According to a refinement of the invention, two different materials are used and coextruded when extruding the tube. So, the tube consists of at least two different materials.

In particular, a section of the tube can consist of a reflective synthetic material, which later forms the backside of the inserted tube.

A reflection can also be achieved with a paint or by a laminated foil.

According to a preferred embodiment of the invention, in the case of a dark, preferably black tube, the tube has an L* value of less than 40, preferably less than 30, and more preferably less than 15 in the L*a*b* color space.

Otherwise, the glass fiber cable may be installed in a similar manner as the light guide made of transparent glass described above.

In particular it is conceivable to clip or insert the tube into a profile by means of at least one mounting member with form-fitting engagement.

Preferably, the glass fiber cable is also set back relative to the adjacent profile, in particular by at least 0.5 mm, preferably by at least 1 mm.

Preferably, the glass fiber cable also has a diameter from 0.2 to 10 mm, more preferably from 0.5 to 5 mm, and most preferably from 2 to 4 mm.

The linear illumination device of the invention finds application in particular in vehicles. It is furthermore conceivable to inject the light of an RGB light source so that the light color can be modified.

The invention further relates to a linear illumination device, in particular a linear illumination device as described above, which comprises a side-emitting glass fiber cable that is arranged in a tube. According to the invention the tube is dyed colorful.

So in this embodiment of the invention, dyeing of the tube is achieved using colored ink particles.

More particularly, the material of the tube exhibits a chroma $C^*_{ab}$ of greater than 10, preferably greater than 25, and most preferably greater than 30 in the L*a*b* color space. Chroma $C^*_{ab}$ is defined as the root of the sum of the squares of a* and b*.

In this embodiment of the invention, i.e. the embodiment with a colorful tube, the linear illumination device preferably comprises a light source, in particular an LED light source whose wavelength is matched with the color of the tube.

Unlike with an achromatically dyed tube, it has been found that the use of a white-light light source, for example, results in undesirable discoloration in the end portions of the tube.

Preferably, a light source is used which emits a dominant wavelength that differs from the wavelength corresponding to the color of the tube by not more than 30 nm, preferably not more than 20 nm.

That means, the light source emits in about the same wavelength which corresponds to the color of the tube.

Preferably, a light source with exactly one emission peak is used. So preferably therefore, no light source with a color that is composed of two or more wavelength peaks is used.

More particularly, a light source that is used has an emission maximum which in the spectrum of the light source has a standard deviation a within a range of not more than ±50 nm, preferably not more than ±25 nm.

Thus, a preferably employed light source emits in a narrow spectrum. In particular an LED light source with substantially monochromatic emission can be used.

In this way it can be achieved that even if a colorfully dyed tube is used, the linear illumination device will emit light with a very uniform color impression.

Due to its robustness, the linear illumination device can particularly be used outside. However, use as a contour lighting in the interior is also conceivable. This is especially true for the embodiment in form of a side-emitting glass fiber cable which may for instance be used in interior covering so as to look like a transition seam of a fabric or leather covering, for example. When switched on, a sharply contoured illumination is resulting, whereas in daylight the linear illumination device will be nearly invisible.

Other possible applications include for instance medical devices as well, in particular contour lighting of treatment chairs, operating rooms, tomography equipment, X-ray equipment, etc.

Furthermore, linear illumination devices may be provided with a length of more than 1 m, preferably more than 3 m, especially for exterior lighting. Contour lighting for trucks may also be provided in this manner, for example.

An application as aisle lighting in aircraft or vessels is likewise conceivable, as well as for illuminated window contours, as a contour lighting in the kitchen area or on a piece of furniture. Furthermore it is possible to illuminate controls or seats, for example. Also conceivable are control cabinets, game consoles, stoves, fireplaces, furniture, and design elements on lamps themselves.

Finally, it is also conceivable to design functional or status displays in form of linear illumination devices. Furthermore it is conceivable to partly implement the night lighting in a vehicle cockpit using linear illumination devices according to the invention.

The invention furthermore relates to a covering for a door, wall, or ceiling of a vehicle, the covering including a linear illumination device as described above comprising a glass fiber bundle introduced in a tube.

Preferably, the tube is secured in a groove with a clamp or glue connection.

In particular it is contemplated that in the off state of the linear illumination device a dyed tube, especially a colorful dyed tube is matched with the color of the adjacent covering part.

In the on state, light of the same color is emitted according to one embodiment.

According to another embodiment, for which preferably an achromatically dyed tube is used, especially a black or silver tube, the linear illumination device emits light of a different color, and when turned on the linear illumination device becomes visually apparent.

BRIEF DESCRIPTION OF THE DRAWINGS

The subject matter of the invention will now be explained in more detail with reference to the drawings.

DETAILED DESCRIPTION

Figure 1:
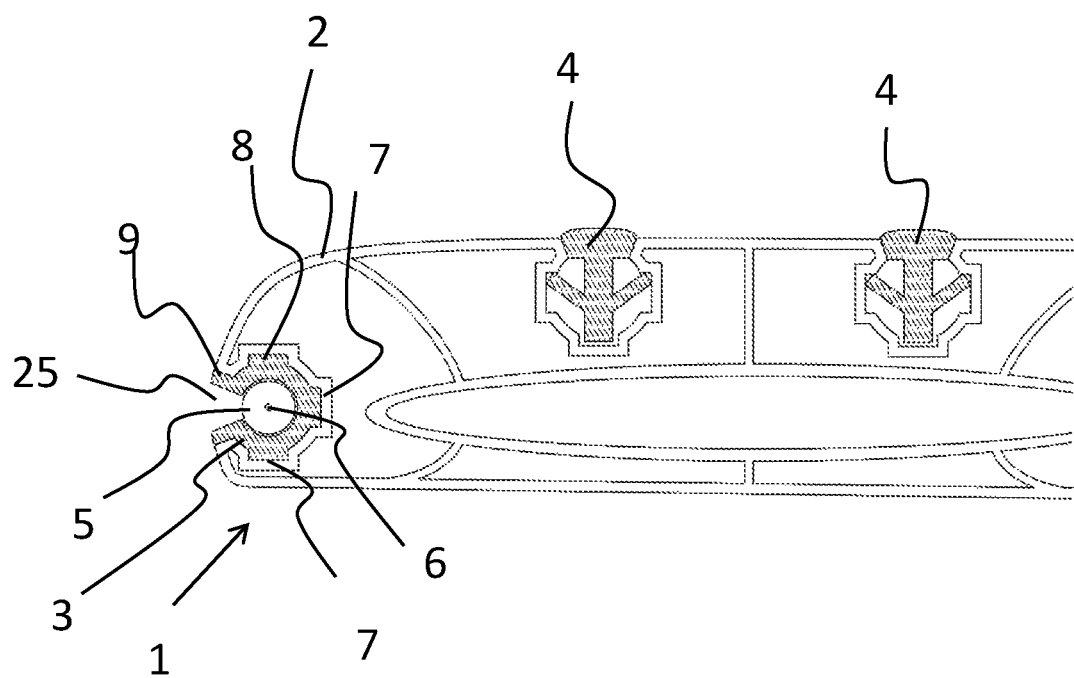
FIG. 1 shows a sectional view of a first embodiment of a linear illumination device according to the invention.

FIG. 1 shows a sectional view of a first embodiment of a linear illumination device 1 according to the invention.

In this exemplary embodiment, linear illumination device 1 is configured as a footboard and comprises a profile 2, which may in particular be made of aluminum. Profile 2 is a hollow chamber profile.

Recessed in the profile 2 are, inter alia, plastic anti-slip strips 4 which serve as a kick protection reducing the risk of scratching the adjacent profile 2.

In order to provide a linear illumination device, a light guide 5 made of glass is inserted in an appropriate recess of the profile 2 at one side of profile 2 with positive interlocking fit, i.e. form-fitting engagement, by means of a mounting member 3. The light guide may for example be inserted by a sliding movement from one end.

In the present exemplary embodiment, the glass light guide 5 comprises a colored glass core 6, in particular made of white glass. Due to the colored glass core 6, light is emitted sidewards, through opening 25.

Mounting member 3 is provided in form of a plastic profile and has interlocking, i.e. form-fitting elements 8 seated in complementary recesses 7 of profile 2.

Light guide 5 made of glass is set back relative to the adjacent profile 2, so that it is protected from damage.

Otherwise, the light guide 5 made of glass directly defines the light exit surface through which the light can be seen through opening 25.

Furthermore, the mounting member 3 additionally has wings 9 protruding beyond the glass light guide 5 thereby additionally protecting the latter from damage.

The mounting member 3 which encloses the light guide 5 by at least 270° is limiting the opening angle of the linear illumination device towards a viewer. The opening angle is less than 90°.

In this exemplary embodiment, the mounting member 3 in the form of a plastic profile is black.

In unlit condition, due to the transparent configuration of light guide 5, a viewer will see the black mounting member 3 behind, so that light guide 5 is almost invisible in daylight.

Rather, the linear illumination device will resemble an embedded plastic anti-slip strip 4.

It will be understood that in this embodiment of the invention which relates to a footboard, the light guide 5 is arranged at a lateral side in its installed state, since otherwise dirt could accumulate in the cone defined by mounting member 3.

For an installation on the upper side it is conceivable to close the cone defined by opening 25 by a transparent plastic element (not illustrated).

Figure 2:
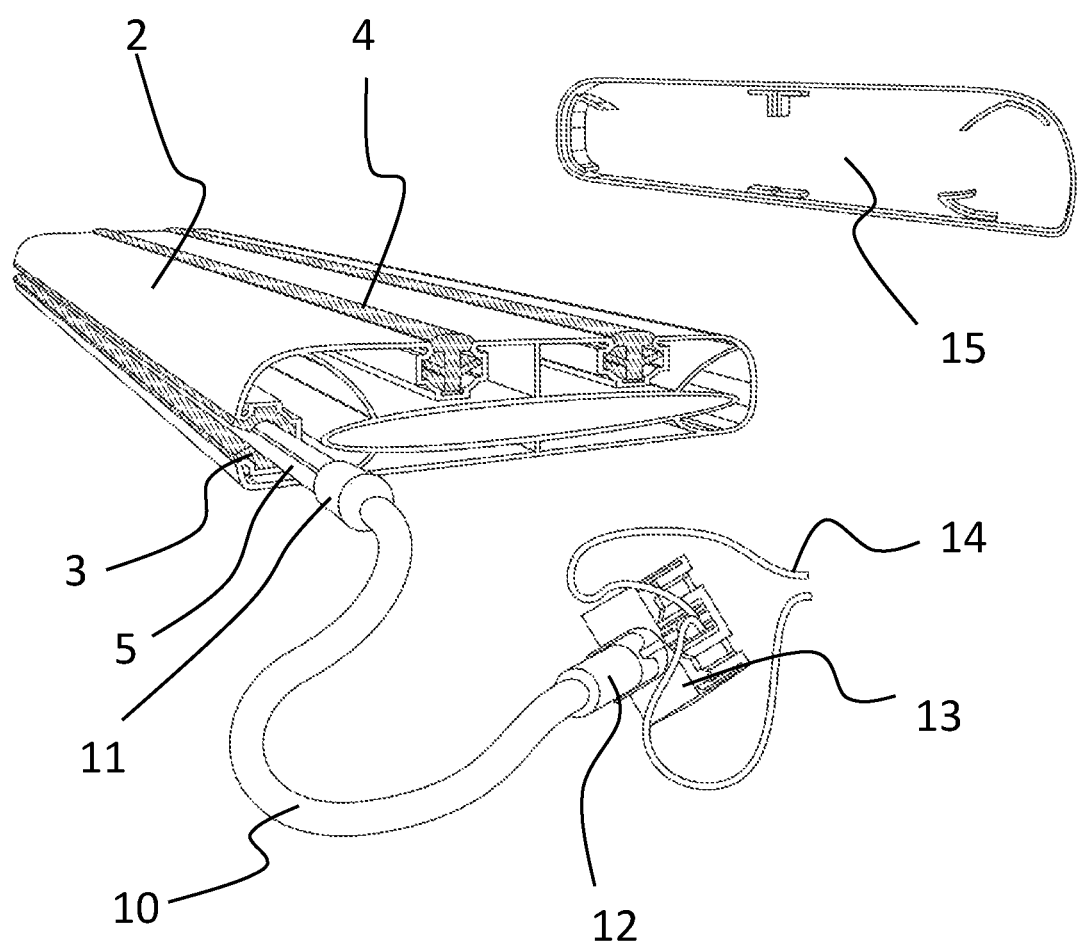
FIG. 2 is a perspective view of an exemplary embodiment.

FIG. 2 is a perspective view illustrating a linear illumination device 1 which is also designed as a footboard.

Metal profile 2 can be seen, in which anti-slip strips 4 are embedded.

Light guide 5 which is accommodated in profile 2 in form-fitting engagement by means of mounting member 3 is coupled with an LED light source 13 via a flexible light guide 10.

For this purpose, flexible light guide 10 is terminated at each of its ends by a ferrule 11, 12. In this manner, a plug-in connection can be provided, for example.

LED light source 13 is preferably made to be water-tight. The LED light source 13 is powered via cables 14.

Since the LED light source 13 can be installed at an angle, light guide 5 may be arranged close to the end face of profile 2.

In the assembled state, profile 2 is closed by cap 15. In this case, LED light source 13 and flexible light guide 10 for connecting the latter will be arranged in cap 15. Therefore, only light guide 5 can be seen.

This embodiment variation of the invention allows for a very simple and yet robust and weatherproof design of a footboard with contour illumination which is almost invisible in unlit condition.

Figure 3:
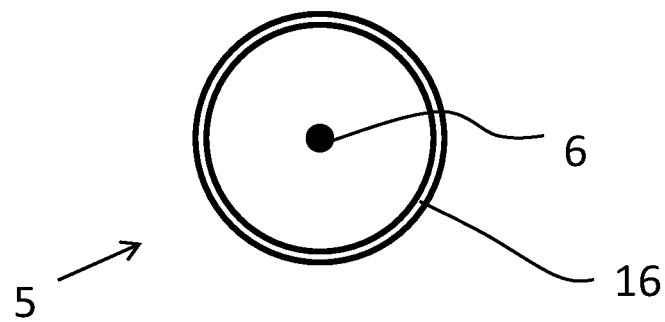
FIG. 3 is intended to illustrate and explain in more detail the embodiment with a transparent light guide made of glass.

FIG. 3 schematically illustrates the light guide 5 made of glass which is employed.

It includes a colored glass core 6, in particular of white glass.

Furthermore, light guide 5 comprises a cladding material 16 which has a lower refractive index than the core glass, so that total internal reflection is obtained in this way.

Due to the colored glass core 6 light is emitted sidewards, since the colored glass core 6 acts as a scattering center.

Figure 4:
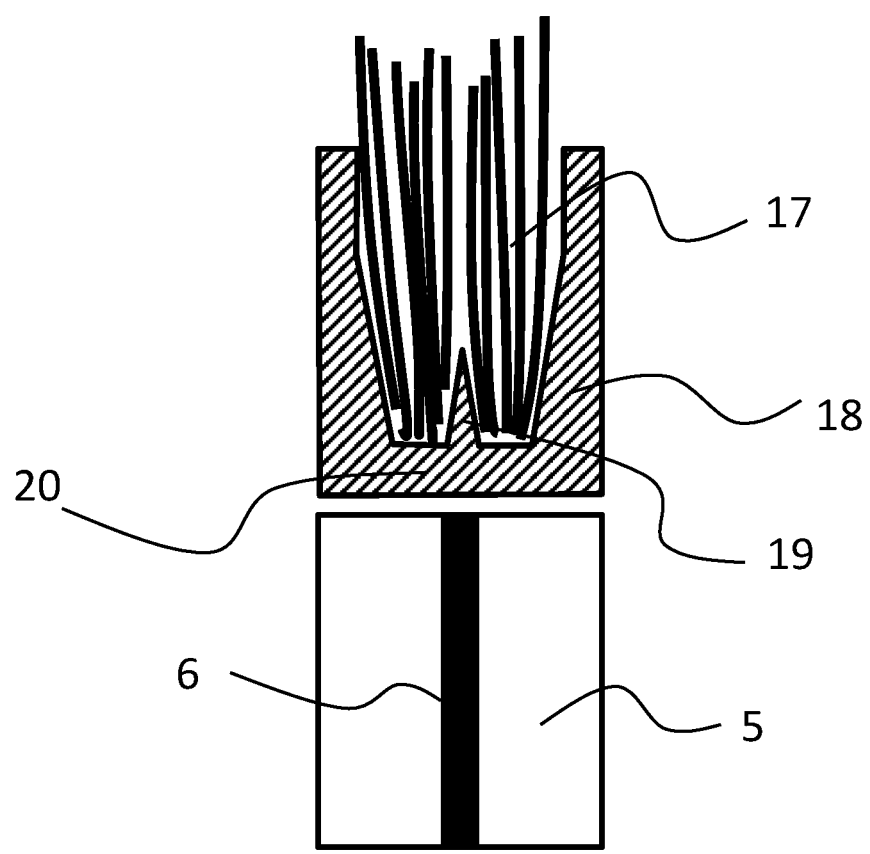
FIG. 4 is intended to illustrate and explain in more detail the injection of light into the transparent light guide made of glass.

Referring to FIG. 4, the injection of light into light guide 5 made of glass will be explained schematically.

A glass fiber bundle 17 is employed as the flexible light guide, which is usually disposed in a tube (not illustrated).

For terminating the fiber bundle 17, the tube is removed at the end of the bundle, and the individual glass fibers of the glass fiber bundle 17 are inserted into ferrule 18, which previously has been filled with a transparent optical adhesive.

A pin 19 protrudes from the base 20 of the ferrule opposite to the colored glass core 6 to displace the individual glass fibers in the area of colored glass core 6 when the glass fiber bundle is inserted, so that little or no light is directly injected into colored glass core 6.

In this way, inhomogeneous radiation in the end region is avoided.

It will be understood that further coupling elements for coupling ferrule 18 and light guide 5 are not shown in this schematic drawing. This relates in particular to form-fitting or clamping elements.

Figure 5:
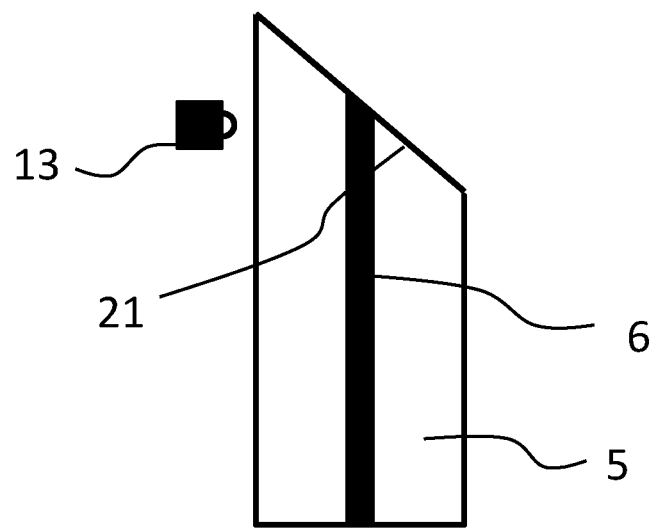
FIG. 5 shows an alternative embodiment of light injection.

FIG. 5 shows an alternative embodiment in which the light guide 5 made of glass and including the colored glass core 6 is chamfered at the end. Light from LED light source 13 is irradiated into the light guide 5 from a lateral side thereof and is deflected by total internal reflection at face 21 to propagate along light guide 5.

This embodiment variation allows for an even more compact design as compared to the embodiment variation illustrated in FIG. 2, but usually will be associated with higher light loss and less homogeneous illumination in the end region.

Figure 6:
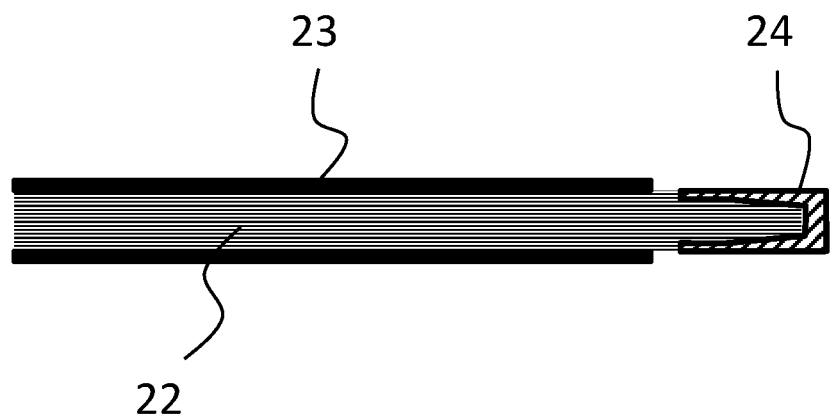
FIG. 6 is intended to illustrate and explain the alternative embodiment of the invention which uses a flexible glass fiber cable.

FIG. 6 schematically illustrates an alternative embodiment of the invention, in which a flexible glass fiber cable 22 is employed for emitting light sidewards.

Glass fiber cable 22 is coupled to an LED light source (not shown) via a ferrule 24.

The tube 23 of the glass fiber bundle is dyed.

In one embodiment of the invention, tube 23 is dyed black and therefore appears black in unlit condition so that it is almost indistinguishable from adjacent components.

However, a different coloring which has approximately the same color as an adjacent receptacle, in particular an adjacent covering part, is likewise conceivable.

Figure 7:
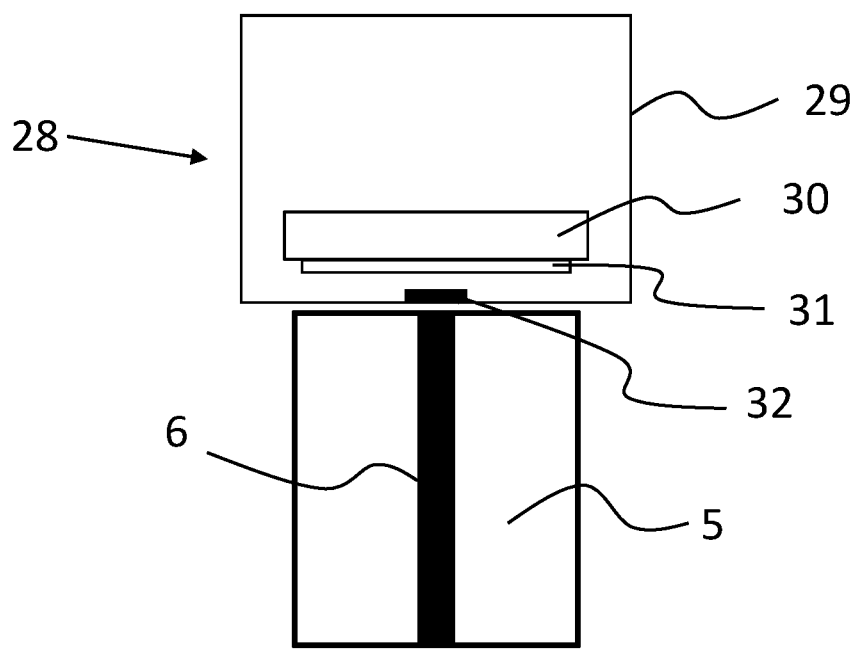
FIG. 7 schematically illustrates how an LED light source is directly coupled to a light guide made of glass.

FIG. 7 schematically illustrates how an LED light source can even be directly coupled to the end of a light guide 5 made of glass.

In this exemplary embodiment, light guide 5 made of glass comprises a glass rod including a colored glass core 6 (corresponding to the embodiments of FIG. 1 and FIG. 2).

As a difference to the embodiment illustrated in FIG. 1 and FIG. 2, in this exemplary embodiment an LED light 28 is directly placed on the end of light guide 5.

LED light 28 comprises a housing 29.

A printed circuit board 30 with an LED_31 is disposed within housing 29, in the present exemplary embodiment in the form of a thin film LED.

Opposite colored glass core 6 the housing 29 has a masking 32 shadowing colored glass core 6.

This contributes to reduce inhomogeneities near the position of light injection.

Masking 32 may, for example, comprise a dark stained area in an otherwise transparent housing base. In the case of a housing that opens downwardly (not shown), the masking may as well be provided as a cover connected with the side walls of the housing by webs.

Figure 8:
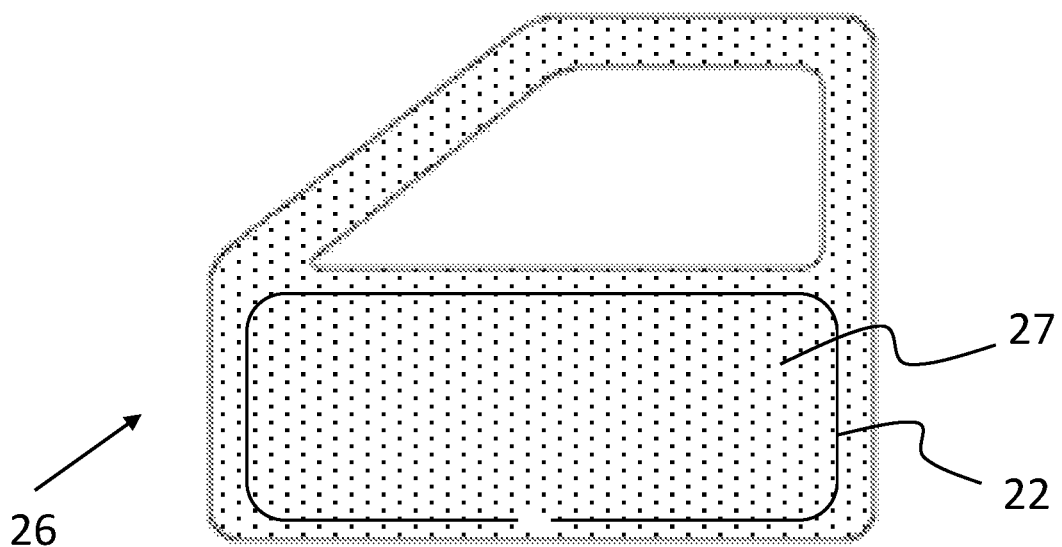
FIG. 8 is a schematic view of a vehicle door provided with a covering in which a side-emitting glass fiber cable is installed.

FIG. 8 is a schematic view of a vehicle door 26 in which a side-emitting glass fiber cable 22 is installed as an ambient lighting.

For this purpose vehicle door 26 comprises a covering 27 on its inner side, for example of a plastic material. Covering 27 has a groove formed therein, which predetermines the contour of the ambient lighting.

Glass fiber cable 22 is clamped or glued into this groove.

In one embodiment, a glass fiber cable 22 is used which has a dark colored tube. Preferably in this embodiment of the invention, the adjacent covering 27 is also black or dark gray.

So in unlit condition the glass fiber cable 22 will be hardly visible, whereas in the dark a highly visible and visually pleasing ambient lighting is provided.

When an achromatically dyed tube is used, it is in particular also possible to use an RGB light source. This moreover allows to modify the light color of the ambient lighting.

In another embodiment of the invention, the tube is dyed colorful. Preferably in this embodiment of the invention, the adjacent covering 27 is also provided in approximately the same color corresponding to the tube.

It has been found that for this embodiment of the invention an LED light source is preferred whose color matches the color of the tube, in particular an LED light source having only a single emission peak, i.e. a light source which preferably emits light in a narrow spectral range.

In this way it is possible to provide an ambient lighting with a homogenous color impression even with a colorful dyed tube.

At all embodiments, the backside of the tube, accordingly the side of the clamped or glued tube of the glass fiber cable 22 adverted to the viewer, can be embodied as a reflection surface. This can be achieved with a coextruded reflective material, with a paint or with an inserted strip of a reflective material, in particular with a metal foil.

For this embodiment of the invention, the tube is preferably not exactly circular in order to facilitate an oriented insertion of the glass fiber cable in the groove. In particular, the tube can comprise projections which axially extend outside and which prevent twisting of the tube.

The invention permits to provide sharply contoured linear illumination devices which are robust and weatherproof and at the same time hardly detectable in unlit condition.

| | LIST OF REFERENCE NUMERALS | | |
|---|---|---|---|
| 1 | Linear illumination device | 17 | Glass fiber bundle |
| 2 | Profile | 18 | Ferrule |
| 3 | Mounting member | 19 | Pin |
| 4 | Anti-slip strip | 20 | Base |
| 5 | Light guide made of glass | 21 | Face |
| 6 | Colored glass core | 22 | Glass fiber cable |
| 7 | Recess | 23 | Tube |
| 8 | Interlocking element | 24 | Ferrule |
| 9 | Wing | 25 | Opening |
| 10 | Flexible light guide | 26 | Vehicle door |
| 11 | Ferrule | 27 | Covering |
| 12 | Ferrule | 28 | LED light |
| 13 | LED light source | 29 | Housing |
| 14 | Cable | 30 | PCB |
| 15 | Cap | 31 | LED |
| 16 | Cladding material | 32 | Masking |

What is claimed is:

1. A linear illumination device, comprising a side-emitting transparent light guide made of glass held in a profile with positive interlocking fit by outward facing projections on a mounting member, wherein the mounting member has wings laterally projecting beyond the light guide with the glass directly defining a light exit surface through which light can be seen.

2. The linear illumination device as claimed in claim 1, wherein the mounting member and the profile have complementary interlocking elements that secure the mounting member.

3. The linear illumination device as claimed in claim 1, wherein the mounting member is secured against rotation relative to the profile.

4. The linear illumination device as claimed in claim 1, further comprising an opening angle to a viewer that is limited by the mounting member, and wherein the opening angle is less than 90°.

5. The linear illumination device as claimed in claim 1, wherein the side-emitting transparent light guide has a rear side that is dark has an L* value of less than 40 in the L*a*b* color space.

6. The linear illumination device as claimed in claim 1, wherein the profile is dark and has an L* value of less than 40 in the L*a*b* color space.

7. The linear illumination device as claimed in claim 1, wherein the side-emitting transparent light guide is set back relative to the profile by at least 0.5 mm.

8. The linear illumination device as claimed in claim 1, wherein the side-emitting transparent light guide is connected, via a flexible light guide, to an LED light source that is arranged at an angle relative to the side-emitting transparent light guide.

9. The linear illumination device as claimed in claim 8, wherein the flexible light guide and the LED light source are arranged in a cap attached to the profile.

10. The linear illumination device as claimed in claim 1, wherein the mounting member surrounds the side-emitting transparent light guide by at least 270°.

11. A linear illumination device, comprising:
a side-emitting transparent light guide made of glass and having a light exit surface;
a profile having a light exit opening and mounting recesses on an inner surface; and
a mounting member enclosing the side-emitting transparent light guide with at least the light exit surface visible through the light exit opening of the profile and with the glass directly defining the light exit surface through which the light can be seen through light exit opening, the mounting member having form-fitting elements on an outer surface that are seated in the recesses of the profile with the side-emitting light guide set back relative to the profile so that the side-emitting light guide is protected from damage, wherein the mounting member further comprises wings protruding beyond the side-emitting light guide to further protect the side-emitting light guide from damage.

12. The linear illumination device as claimed in claim 11, wherein the mounting member surrounds the side-emitting transparent light guide by at least 270°.

13. The linear illumination device as claimed in claim 11, wherein the mounting member is secured against rotation relative to the profile by the form fitting elements.

\* \* \* \* \*